United States Patent [19]

Nakatsukasa

[11] Patent Number: 5,090,261
[45] Date of Patent: Feb. 25, 1992

[54] GEARED MOTOR

[75] Inventor: Tetsuya Nakatsukasa, Okazaki, Japan

[73] Assignee: Asmo Co., Ltd., Shizuoka, Japan

[21] Appl. No.: 615,843

[22] Filed: Nov. 20, 1990

[30] Foreign Application Priority Data

Nov. 21, 1989 [JP] Japan .................. 1-135206

[51] Int. Cl.$^5$ .......... F16H 27/02; B25G 3/02; F16D 3/52
[52] U.S. Cl. .......... 74/89.14; 74/400; 74/425; 384/610; 403/364; 403/383; 464/73; 464/76
[58] Field of Search .......... 74/89.14, 400, 425; 384/610; 403/364, 383; 464/73, 76

[56] References Cited

U.S. PATENT DOCUMENTS

| | | | |
|---|---|---|---|
| 2,616,273 | 11/1952 | Pringle | 464/73 |
| 2,716,334 | 8/1955 | Scott et al. | 464/73 |
| 2,882,077 | 4/1959 | Marsh | 403/383 |
| 4,170,847 | 10/1979 | Pickles | 49/349 |
| 4,241,593 | 12/1980 | Matyl et al. | 464/73 |
| 4,575,277 | 3/1986 | Dickey et al. | 403/383 X |
| 4,618,273 | 10/1986 | Götz et al. | 384/610 X |
| 4,742,726 | 5/1988 | Adam et al. | 74/425 |

*Primary Examiner*—Allan D. Herrmann
*Assistant Examiner*—David W. Laub
*Attorney, Agent, or Firm*—Venable, Baetjer, Howard & Civiletti

[57] ABSTRACT

A geared motor comprising a rotating axle rotating in accordance with the rotation of a rotor, a gear rotating axle for outputting from the rotating axle speed reduced rotation, and a flexible coupling consisting of a first coupling disposed on the rotating axle of the rotor and rotating together with the rotating axle and the rotor, a second coupling disposed on the gear rotating axle, and rotating together with the gear rotating axle, a rubber damper disposed between the first coupling and the second coupling for transmitting the rotation of the first coupling to the second coupling, a thrust-force bracing member disposed between the rotating axle of the rotor and the gear rotating axle and in contact with the rotating axle and the gear rotating axle, for transmitting thrust force from one of the rotating axle of the rotor and the gear rotating axle to the other of the two arranged so that even if thrust force acts on the rotating axle of the rotor or on the gear rotating axle, the thrust force does not act on the first and second couplings or the rubber damper, due to the thrust force bracing member. Therefore, the life-expectancy of both of the couplings and the rubber damper, and therefore of the flexible coupling, is improved.

23 Claims, 5 Drawing Sheets

GEARED MOTOR

BACKGROUND OF THE INVENTION

1. Field of the Invention

The present invention relates to a geared motor, particularly, a geared motor provided with a geared rotating axle for transmitting speed reduced rotation of a rotor of the motor.

2. Description of Related Art

A geared motor such as a motor for driving a wiper is typically provided with a gear for transmitting speed-reduced rotation from a rotating axle, for example, an armature shaft, of the motor, while also changing the direction of rotation. This type of geared motor for driving a wiper is comprised of a gear section in which reduction gears are disposed, provided adjacent to a motor section in which a rotor, a stator and a rotor axle are disposed.

A worm gear which is comprised of a worm and a gear wheel is generally used as a reduction gear in the gear section. The worm is connected to the rotating axle of the rotor in the motor section, and the worm is engaged with the gear wheel. The gear wheel has a rotating axle to which a crank arm for driving the wiper is connected.

The motor drives the wiper as follows: when the rotor in the motor section rotates, the worm rotates with the rotor and the gear wheel is rotated by the worm. Accordingly, the crank arm for driving the wiper is driven.

A connection member is indispensable to this type of geared motor, for connecting the rotating axle of the rotor in the motor section with a rotating axle in the gear section, such as the worm part of a worm gear used for transmitting speed reduced rotation in the above example. Further, it is necessary for the connection member to transmit rotation while absorbing any oscillation due to eccentricity of the two rotating axles with respect to each other. To satisfy these conditions, a geared motor using a flexible coupling as the connection member is known to us, for example, U.S. Pat. No. 4,170,847.

In this geared motor using a flexible coupling, oscillation is reduced and rotation is reliably transmitted from the first to the second of the two rotating axles, since the oscillation due to the eccentricity of the two rotating axles is absorbed by the flexible coupling portion which is made of rubber.

However, in this type of geared motor there exists a problem in that there is no provision for longitudinally acting thrust force which acts on both the rotating axle of the rotor in the motor section and the rotating axle of the speed reduced rotation transmitting gear in the gear section, since the geared motor uses an ordinary flexible coupling whose object is only to transmit the rotation while absorbing oscillation due to eccentricity of the two rotating axles. Therefore, there is a possibility of the life-expectancy of the flexible coupling being reduced due to vibration occurring along the longitudinal thrust axis and affecting the connecting portions of the rotating axle of the rotor and the rotating axle of the speed reduced rotation transmitting gear, and the connection member, namely, the flexible coupling. Also, it is impossible to accurately adjust the device for reduction of vibration in the thrust direction since the rotating axle of the rotor and the rotating axle of the speed reduced rotation transmitting gear are connected to each other along the axis of thrust through an elastic body.

SUMMARY OF THE INVENTION

In consideration of the above-described problem, it is an object of the present invention to provide a geared motor having a rotating axle connecting structure which can avoid the stress and damage caused by thrust force acting on the rotating axles and the connection member, while still absorbing oscillation due to eccentricity of the two rotating axles. The geared motor of the present invention has a speed reduction structure which outputs rotation at a speed reduced from that of the rotation of a rotor of a rotary motor comprising:

a rotating axle which rotates in accordance with the rotation of said rotor;

a gear rotating axle disposed such that the axis thereof is substantially in line with the axis of the rotating axle;

a first coupling member disposed on said rotating axle and rotating together with the rotor;

a second coupling member disposed on the gear rotating axle and rotating together with the gear rotating axle;

an elastic damping member disposed between the first coupling member and the second coupling member, for transmitting the rotation of the first coupling member to the second coupling member; and a thrust force bracing member, disposed between the rotating axle and the gear rotating axle, in contact with both the rotating axle and the gear rotating axle, for transmitting the thrust force from one to the other of the rotating axle and the gear rotating axle, while enabling the rotating axle and the gear rotating axle to be braced against each other during said transmission of thrust force.

The above-described structure enables the rotation of the first coupling member deriving from the rotation of the rotor to be transmitted to the second coupling member through the damping member, so as to cause the gear rotating axle to rotate. At this time, oscillation due to eccentricity of the two rotating axles is absorbed, so that vibration is reduced and rotation is reliably transmitted.

Further, thrust force deriving from either the rotating axle of the rotor or the gear rotating axle is transmitted from one to the other thereof through the thrust force bracing member, which is held tightly between the joining ends of the two rotating axles so as to prevent the thrust force from acting on the first coupling member, the second coupling member or the damping member. Accordingly, the first coupling member, the second coupling member and the damping member are not caused to vibrate due to the absorption of thrust force, and their life expectancies are therefore not reduced by wear and tear. Further, it is possible to accurately adjust the device to reduce oscillation in the thrust direction of the system as a whole, of the gear rotating axle and the rotating axle of the rotor.

As explained above, the geared motor of the present invention has a rotating axle connecting structure which can prevent damage from being caused by thrust force acting on the rotating axles and the connection member, while still absorbing oscillation due to eccentricity of the two rotating axles. Therefore, the life-expectancy of the connecting structure linking the rotating axles is not reduced by stress, and accurate adjust-

DETAILED DESCRIPTION OF PREFERRED EMBODIMENTS

Figure 1:
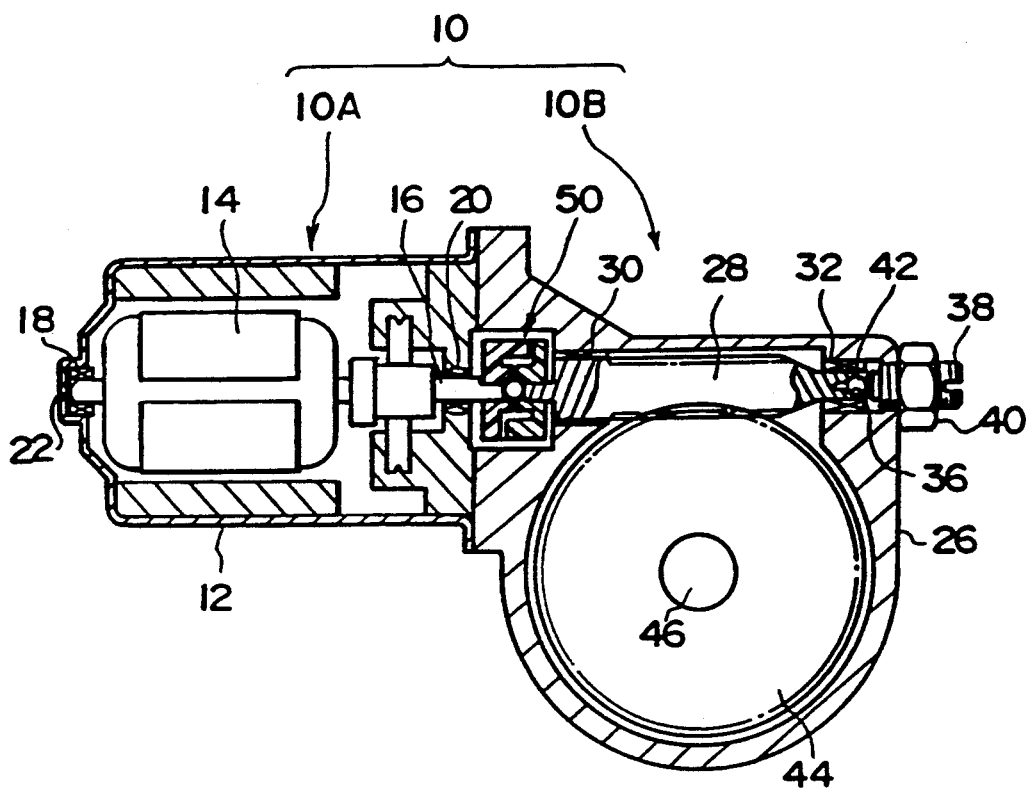
FIG. 1 is a whole sectional view of a geared motor according to the present invention.

FIG. 1 is a cross-sectional view of the whole of a geared motor 10 for a vehicle, as an embodiment of the present invention.

The geared motor 10 is comprised of a motor section 10A and a gear section 10B connected to the motor section 10A. An armature shaft 16 of an armature 14, i.e. a rotor, is supported by a bearing 18 and a bearing 20 inside a body 12 of the motor section 10A. Further, a yoke end thrust support member 22 is disposed around the bearing 18. The distal end portion of the armature shaft 16 is formed into a substantially D-shaped insertion tip 24 as shown in detail in FIGS. 2 and 4. The insertion tip 24 is inserted into a coupling 52, and extends to the inside of a body 26 of the gear section 10B connected to the body 12 of the motor section 10A.

Figure 2:
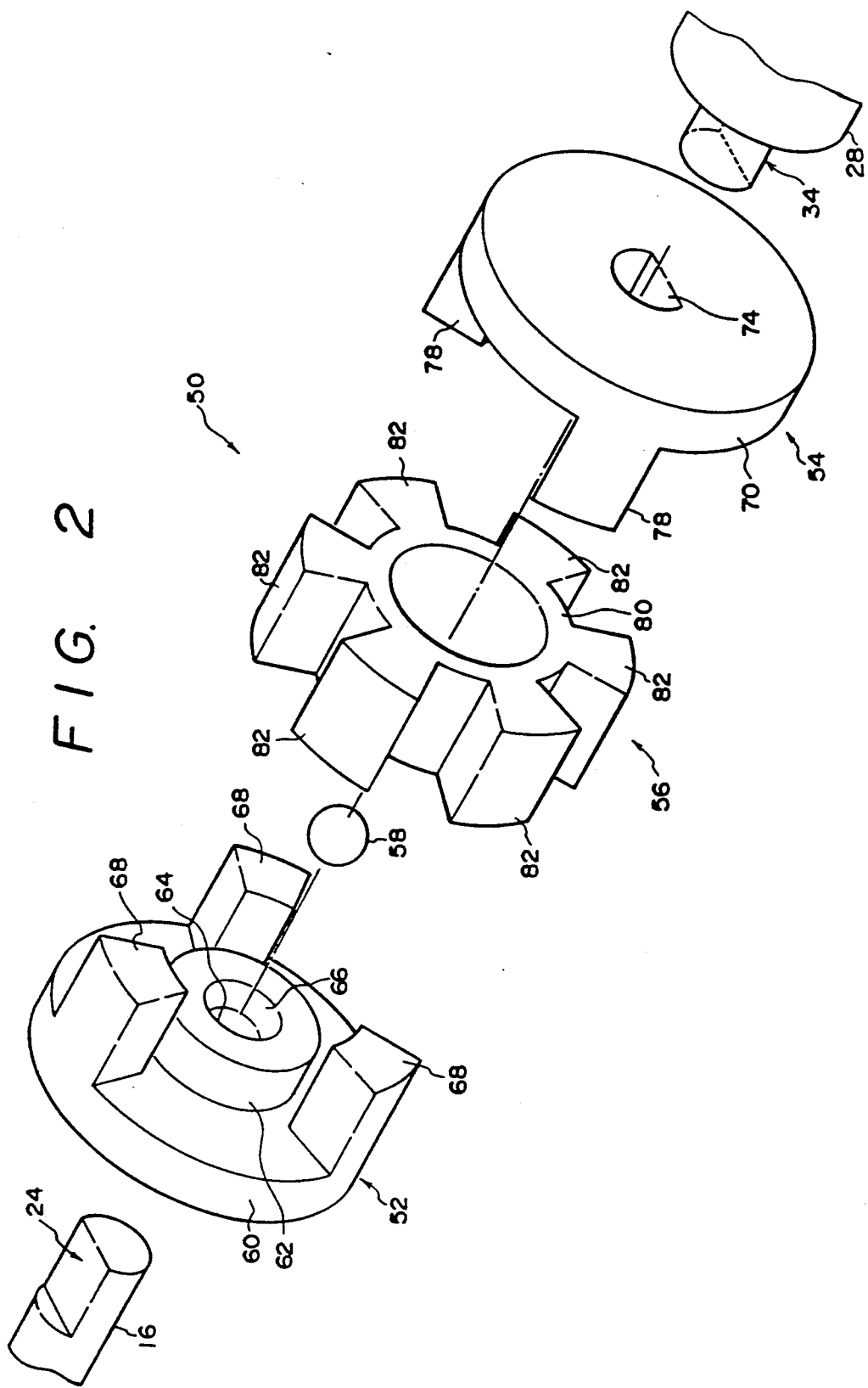
FIG. 2 is an exploded perspective view of a flexible coupling.
Figure 4:
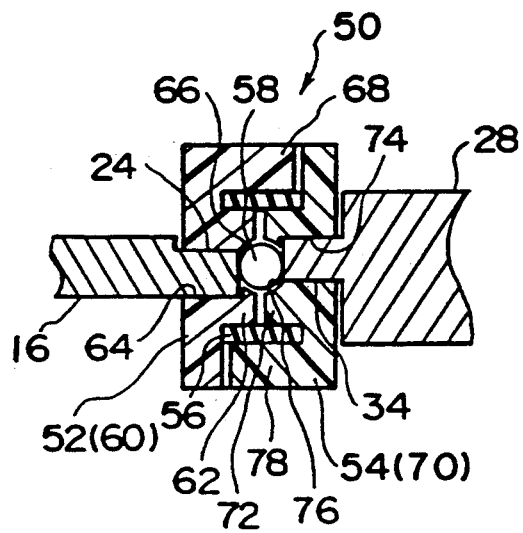
FIG. 4 is a cross-sectional view taken along the line 4—4 of FIG. 3.

In the gear section 10B, a worm 28 as a gear rotating axle is supported on the body 26 by a bearing 30 and a bearing 32. One end portion of the worm 28 is formed into a substantially D-shaped insertion tip 34, as shown in FIGS. 2 and 4 as in the case of the armature shaft 16, and the insertion tip 34 is inserted into a coupling 54, the two couplings 52 and 54 partially comprising flexible coupling 50 which functions as a connecting structure, connecting one end of the worm 28 to the distal end of the armature shaft 16. (The connecting structure of coupling 50 is described in detail in the following section.)

In the other end portion of the worm 28, a fork-like ball receiving portion 36 is formed, as shown in FIG. 1. A thrust adjusting screw 38 penetrates and is fixed to a portion of the body 26 facing the ball receiving portion 36, and a fixing nut 40 engages with the screw 38. The thrust adjusting screw 38 is capable of being moved towards and away from the worm 28 by unscrewing the fixing nut 40. A steel ball 42 is disposed between the thrust adjusting screw 38 and the other end portion of the worm 28, and the steel ball 42 rests in the ball receiving portion 36. Accordingly, thrust load which acts on the worm 28 is transmitted to the thrust adjusting screw 38 through the steel ball 42, and vice versa.

A rotatable gear wheel 44 is disposed in the center of the body 26, and the gear wheel engages with the worm 28. A crank arm (not shown) for driving, for example, a wiper, is connected to a rotating axle 46 of the gear wheel 44. Therefore, rotation of the worm 28 causes speed-reduced rotation of the gear wheel 44, and the crank arm for driving the wiper is driven.

Figure 3:
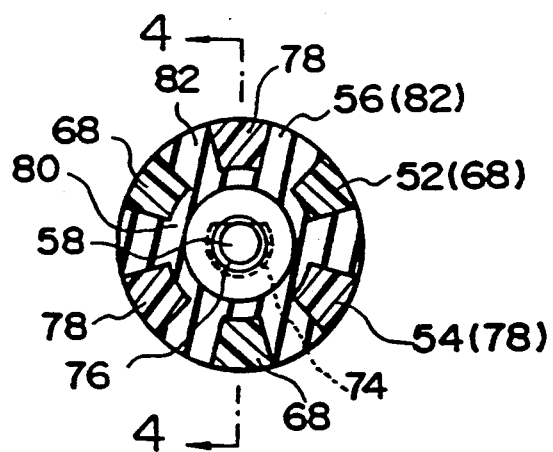
FIG. 3 is a cross-sectional view crossing at right angles the rotational axis of the flexible coupling.

As shown in detail in FIG. 2 to 4, the flexible coupling 50 is comprised of the coupling 52 as a first coupling member, the coupling 54 as a second coupling member, a rubber damper 56 as a damper member and a steel ball 58 as a thrust force bracing member.

A body portion 60 of the coupling 5 is formed substantially in the shape of a disk, and in the center of the body portion 60, a round center portion 62 whose diameter is smaller than the body portion 60 is formed as an axially extending protrusion on one side of the body portion 60. A connection hole 64 is formed though the center of the center portion 62 and the body portion 60, the main part of which has a D-shaped cross-section so as to receive the insertion tip 24 of the armature shaft 16 which extends into the body 26 of the gear section 10B and is inserted into the connection hole 64. As a result of the above construction, the coupling 52 rotates together with the armature shaft 16.

A portion of the cylindrical connection hole 64 on the same side of the body 60 as the protruding center portion 62 is formed in to a bowl-shaped concavity. This bowl-shaped portion of the hole 64 is a ball receiving portion 66 into which one half of the steel ball 58 fits.

On the same side of the body portion 60 as the center portion 62, three arm portions 68 protrude in the same way as the center portion 62, in a direction parallel to the axis of the armature shaft 16 and the worm 28. These arm portions 68 are formed at the same intervals apart on the periphery of the body portion 60.

The coupling 54 is the same shape as the coupling 52 and faces the latter to make a "mirror-image" pair with the coupling 52.

Like the coupling 52, the coupling 54 has three arm portions 78 protruding at the same intervals. A connection hole 74 is formed at the center of a body portion 70 of coupling 54, the main part of which has a D-shaped cross-section, and the insertion tip 34 of the worm 28 is inserted through the hole 74. As a result of the above construction, the coupling 54 rotates together with the worm 28.

A portion of the connection hole 74 is formed in the shape of a bowl, and is a ball receiving portion 76 like the ball receiving portion 66 into which the other half of the steel ball 58 fits. That is, the steel ball 58 is disposed in a spherical space formed by the ball receiving portion 66 of the coupling 52 and the ball receiving portion 76 of the coupling 54. Both the insertion tip 24 of the armature shaft 16 and the insertion tip 34 of the worm are in contact with the steel ball 58. That is to say, the steel ball 58 is held between one end of the armature shaft 16 and one end of worm 28. Accordingly, thrust force acting on either the armature shaft 16 or the worm 28 is directly transmitted to the other of the two through the steel ball 58.

The rubber damper 56 is disposed between the coupling 52 and the coupling 54. The damper 56 is elastic since it is made of rubber. The damper 56 has a cylindrical central bore hole 80. The size of the inside diameter of the bore hole 80 corresponds to the size of the outside diameter of the center portion 62 of the coupling 52, and to the outside diameter of the center portion 72 of the coupling 54. The center portions 62 and 72 fit into respective sides of the bore hole 80. From a ring shaped portion of damper 56 surrounding the hole 80, a plurality of projections 82 project radially at equal intervals. Therefore, as a whole, the rubber damper 56 has substantially the shape of a star. As shown in FIG. 3, the arm portions 68 and 78 of the coupling 52 and the coupling 54 respectively fit into alternate spaces between the projections 82. The coupling 52 and the coupling 54 are connected to each other via the rubber damper 56, and rotation of the coupling 52 is transmitted to the coupling 54 through the rubber damper 56.

The function of this embodiment is explained below:

In the geared motor 10 having the construction mentioned above, rotation of the armature 14 and connected armature shaft 16, in the motor section 10A, is transmitted to the worm 28 through the flexible coupling 50.

That is to say, rotation of the coupling 52 caused by rotation of the armature shaft 16 is transmitted to the coupling 54 through the rubber damper 56, so as to rotate the worm 28. At this time, oscillation due to eccentricity of the armature shaft 16 and the worm 28 is absorbed by the rubber damper 56 so that vibration inside the geared motor is reduced and the rotation of the armature shaft 16 is reliably transmitted to the worm 28.

Further, thrust force generated along the armature shaft 16 or the worm 28 is transmitted to the other the two through the steel ball 58, so that the thrust force does not act on the coupling 52, the coupling 54 or the rubber damper 56. Accordingly, the life-expectancy of coupling 52, coupling 54 and rubber damper 56 and there flexible coupling 50 as a whole is not reduced by stress, since thrust force does not cause vibration.

Further, when the thrust force adjusting screw 38 is moved in the thrust direction, i.e., along the extended axis of the worm 28, to adjust the relational position of the worm 28 with respect to the armature shaft 16, the moving force is transmitted to the rotating axle, by virtue of the steel ball 58, without acting on the coupling 52, the coupling 54 or the rubber damper 56. Accordingly, it is possible to easily adjust the position of the worm 28 with respect to the gear wheel 44, thereby enabling smooth rotation of the gear wheel 44.

Figure 5:
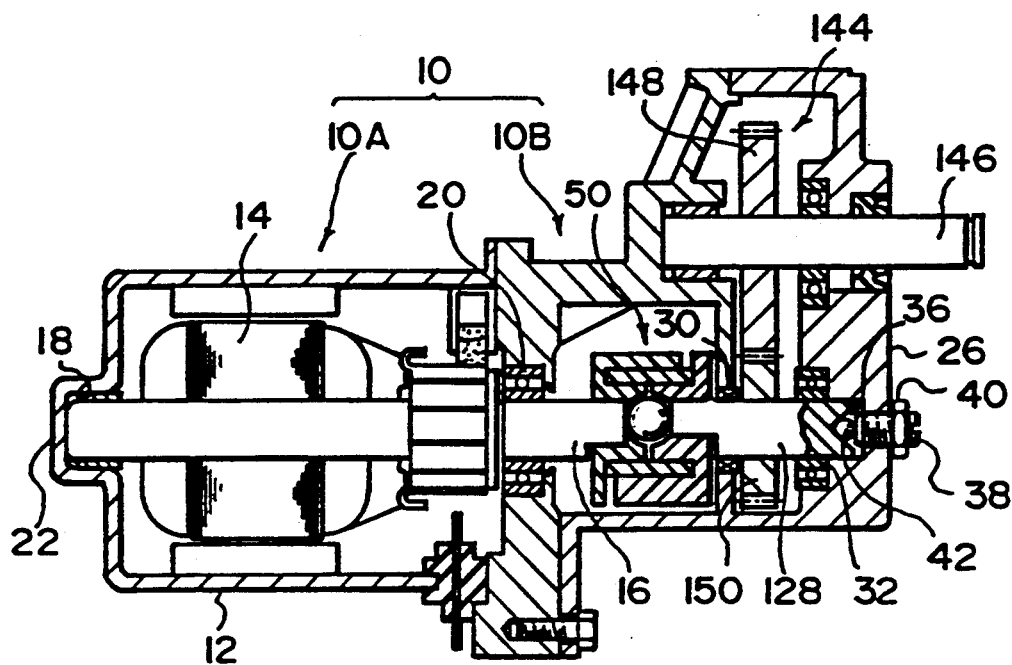
FIG. 5 is a whole sectional view of a geared motor using spur gears.

As an alternate to gear wheel 44, a spur gear 144 can be used as shown in FIG. 5. In this modification, parts in common with the ones in the above described embodiment are given the same numerals, and explanation of these common parts is omitted.

In the gear section 10B, a first shaft 128 as the gear rotating axle is supported on the body 26 by the bearing 30 and the bearing 32. One end of the first shaft 128 is formed into a substantially D-shaped insertion tip 34. Insertion tip 34 is inserted into the coupling 54. The insertion tip 34 is connected to the armature shaft 16 through the flexible coupling 50. The other end of the first shaft 128 is supported by the bearing 32. The construction of the steel ball 42, the ball receiving portion 36, the thrust adjusting screw 38 and the fixing nut 40 are the same as that of the ones in the previously described embodiment. A small gear wheel 150 is fixedly attached to the first shaft 128 and rotates integrally with the shaft 128 with the center of the shaft 128 as the rotational axis. The small gear wheel 150 engages with a large gear wheel 148. The large gear wheel 148 rotates integrally with the center of a second shaft 146. The second shaft 146 is connected to, for example, a crank arm (not shown) for driving a wiper. When the first shaft 128 rotates, the second shaft 146 rotates at a reduced speed, by virtue of the small gear wheel 150 engaging with the large gear wheel 148, and the crank arm rotates.

Figure 6:
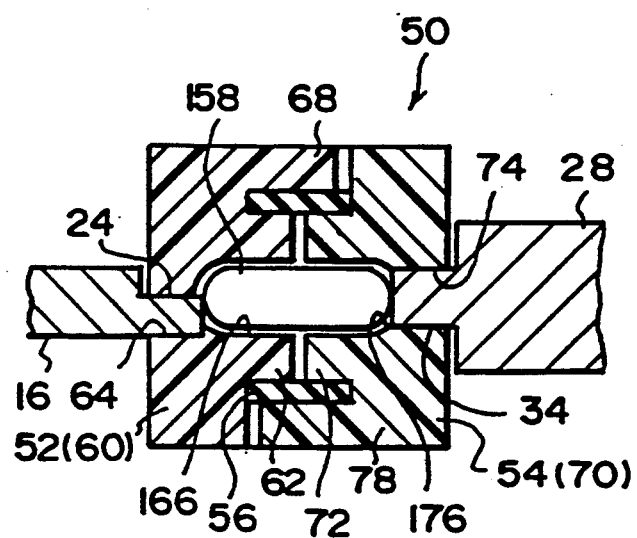
FIG. 6 is a cross-sectional view of a columnar connecting portion used to connect rotating axles.

Instead of the ball 58, a column 158 having two rounded ends can be used as shown in FIG. 6. In this modification, parts in common with the ones in the previously described embodiments are given the same numerals, and explanation of the common parts is omitted. The column 158 is made of steel. A U-shaped concavity is formed at the entrance of the connection hole 64 on the side of the coupling 52 having the central protruding portion 62. The concavity is a column receiving portion 166 into which the column 158 fits. An identical U shaped concavity is formed at the entrance of the connection hole 74 on the side of the coupling 54 having the central protruding portion 72. The concavity is a column receiving portion 176 into which one end of column 158 fits. The column 158 is disposed in a space formed by the column receiving portion 166 and the column receiving portion 176. The insertion tip 24 of the armature shaft 16 and the insertion tip 34 of the worm 28 are in contact with respective ends of column 158. Accordingly, thrust force generated along the two rotating axles, i.e., to either the armature shaft 16 or the worm 28, is directly transmitted to the other of the two through the column 158, and therefore the thrust force does not act on the coupling 52, the coupling 54 or the rubber damper 56, and the life-expectancy of the coupling 52, the coupling 54 and the rubber damper 56 and therefore of flexible coupling 50 as a whole, is not reduced due to stress. Thrust force can be adjusted by the thrust adjusting screw 38 and the fixing nut 40, in the same way as in the previously described embodiment. It is possible to easily adjust for the best engagement of the worm 128 and the gear wheel 144 and to thereby enable smooth rotation of the worm 128 and the gear wheel 144.

Figure 7:
FIG. 7 is a front view of a diamond shaped body used as a thrust force bracing member.

As an alternative to the column 158, a diamond shaped body 258 having 4 rounded points, as shown in FIG. 7, can be used. The concavities on one side of the respective connection holes of the coupling 52 and the coupling 54 are shaped so as to form a space into which the diamond shaped body 258 fits.

What is claimed is:

1. A geared motor having speed reduction structure for outputting rotation which is at a speed reduced from the speed of rotation of a rotor, comprising:

a stator and a rotor;

a rotating axle coupled to said rotor and which rotates in correspondence with rotation of said rotor;

a gear rotating axle aligned with said rotating axle so that the rotational axis of the gear rotating axle is substantially the same as the rotational axis of said rotating axle;

a first coupling member disposed on said rotating axle and rotating together with said rotating axle and said rotor;

a second coupling member disposed on said gear rotating axle and rotating together with said gear rotating axle;

an elastic damping member disposed between said first coupling member and said second coupling member, for transmitting rotation of said first coupling member to said second coupling member; and a thrust force bracing member disposed between said rotating axle and said gear rotating axle and in contact with both said rotating axle and said gear rotating axle, for bracing thrust force between said rotating axle and said gear rotating axle along an axis of thrust that substantially coincides with the rotational axis of the gear rotating axle.

2. A geared motor according to claim 1, wherein said thrust force bracing member comprises a body having convex surfaces facing said rotating axle and said gear rotating axis.

3. A geared motor according to claim 2, wherein said thrust force bracing member comprises a spherical body.

4. A geared motor according to claim 3, wherein said spherical body is a hard spherical body.

5. A geared motor according to claim 4, wherein said hard spherical body is a steel ball.

6. A geared motor according to claim 2, wherein said thrust force bracing member comprises a column disposed such that end surfaces of said column are in contact with the respective end faces of said rotating axle and said gear rotating axle facing said column end surfaces.

7. A geared motor according to claim 2, wherein said thrust force bracing member is diamond-shaped.

8. A geared motor according to claim 2, wherein said first coupling member has a first connecting hole for receiving a distal end of said rotating axle through an entrance side thereof and a first concavity for supporting said thrust force bracing member, said first concavity being provided on a side of said first coupling member opposite from the rotating axle entrance side of said first connecting hole; said second coupling member has a second connecting hole for receiving a distal end of said gear rotating axle through an entrance side thereof and a second concavity for supporting said thrust force bracing member, said second concavity being provided on a side of the second coupling member opposite from the gear rotating axle entrance side of said second connecting hole; said first concavity and said second concavity face each other; and said thrust force bracing member is movably disposed inside a space formed between said first concavity and said second concavity.

9. A geared motor according to claim 1, further comprising thrust force adjusting means for adjusting the position of said gear rotating axle with respect to said rotating axle along said axis of thrust.

10. A geared motor according to claim 9, wherein said thrust force adjusting means comprises a gear rotating axle moving means for moving said gear rotating axle towards or away from the rotating axle along said axis of thrust.

11. A geared motor according to claim 1, further comprising thrust force adjusting means for adjusting the position of said gear rotating axle along said axis of thrust such that the axial force of said gear rotating axle due to the moving of the gear rotating axle is transmitted to said rotating axle through said thrust force bracing member.

12. A geared motor having speed reduction structure for transmitting rotation which is at a speed reduced from the speed of rotation of a rotor, to an operating member, comprising:
   a stator and a rotor;
   a rotating axle coupled to said rotor and which rotates in correspondence with rotation of said rotor;
   a gear rotating axle for transmitting rotation of said rotating axle, disposed such that the rotational axis of said gear rotating axle is substantially the same as the rotational axis of said rotating axle;
   a wheel engaging said gear rotating axle, for transmitting speed reduced rotation of said gear rotating axle to an operating member;
   a first coupling member disposed on said rotating axle and rotating together with said rotating axle and said rotor;
   a second coupling member disposed on said gear rotating axle and rotating together with said gear rotating axle;
   an elastic damping member disposed between said first coupling member and said second coupling member for transmitting rotation of said first coupling member to said second coupling member;
   a thrust force transmitting member disposed between said rotating axle and said gear rotating axle and in contact with both said rotating axle and said gear rotating axle, for transmitting thrust force from one of said rotating axle and said gear rotating axle to the other of said rotating axle and said gear rotating axle along an axis of thrust, and comprising a body having two convex surfaces facing one end of said rotating axle and one end of said gear rotating axle, respectively; and
   a thrust force adjusting means for adjusting the the position of said gear rotating axle with respect to said rotating axle by moving said gear rotating axle along the axis of thrust.

13. A geared motor according to claim 12, wherein said thrust force transmitting member comprises a spherical body.

14. A geared motor according to claim 13, wherein said spherical body is a hard spherical body.

15. A geared motor according to claim 14, wherein said hard spherical body is a steel ball.

16. A geared motor according to claim 12, wherein said thrust force transmitting member comprises a column disposed such that end surfaces of said column are in contact with one end face of said rotating axle and one end face of said gear rotating axle, respectively, which face said end surfaces of said column.

17. A geared motor according to claim 12, wherein said body is diamond shaped.

18. A geared motor according to claim 12, wherein said first coupling member has a first connecting hole for receiving a distal end of said rotating axle through an entrance side thereof and a first concavity for accommodating and supporting said thrust force transmitting member, said first concavity being provided on a side of said first coupling member opposite from the rotating axle entrance side of said first connecting hole; said second coupling member has a second connecting hole for receiving a distal end of said gear rotating axle through an entrance side thereof and a second concavity for accommodating and supporting said thrust force transmitting member, said second concavity being provided on a side of said second coupling member opposite from the gear rotating axle entrance side of said second connecting hole; said first concavity and said second concavity face each other; and said thrust force bracing member is movably disposed inside a space formed between said first concavity and said second concavity.

19. A geared motor according to claim 18, wherein cross-sections of said distal ends of both said rotating axle and said gear rotating axle are D-shaped and cross-sections of said entrance sides of both said first connecting hole and said second connecting hole are D-shaped, enabling the fitting of said distal end of said rotating axle into said first connecting hole and said distal end of said gear rotating axle into said second connecting hole so as to transmit the rotation of said rotating axle to said first coupling member and the rotation of said second coupling member to said gear rotating axle.

20. A geared motor according to claim 12, wherein said wheel comprises a gear wheel for transmitting the rotation of said gear rotating axle to the operating member while changing the axis of rotation by 90-degrees from the axis of rotation of said gear rotating axle.

21. A geared motor according to claim 12, wherein said wheel comprises at least one spur gear for transmitting the rotation of said gear rotating axle to the operating member, such that the axis of the transmitted rotation is parallel to the axis of rotation of said gear rotating axle.

22. A geared motor according to claim 12, wherein said elastic damping member is made of rubber.

23. A geared motor according to claim 12, wherein the axis of thrust is substantially aligned with the rotational axis of the gear rotating axle.

* * * * *